United States Patent
Lee et al.

(10) Patent No.: US 8,872,723 B2
(45) Date of Patent: Oct. 28, 2014

(54) LIGHT AND RF TRANSPARENT ENCLOSURE FOR USE WITH ASSET TRACKING DEVICE

(71) Applicant: Petari USA, Inc., Boston, MA (US)

(72) Inventors: Brian Lee, Boston, MA (US); Mrinmoy Chakraborty, Bangalore (IN); Jamshed Dubash, Shrewsbury, MA (US); Jahangir Nakra, Titusville, NJ (US)

(73) Assignee: Senaya, Inc., Boston, MA (US)

( * ) Notice: Subject to any disclaimer, the term of this patent is extended or adjusted under 35 U.S.C. 154(b) by 0 days.

(21) Appl. No.: 13/940,842

(22) Filed: Jul. 12, 2013

(65) Prior Publication Data
US 2014/0018023 A1    Jan. 16, 2014

Related U.S. Application Data

(60) Provisional application No. 61/671,230, filed on Jul. 13, 2012.

(51) Int. Cl.
| | |
|---|---|
| H01Q 1/42 | (2006.01) |
| H04B 1/03 | (2006.01) |
| H04B 1/38 | (2006.01) |
| H01Q 9/34 | (2006.01) |
| G06Q 50/28 | (2012.01) |

(52) U.S. Cl.
CPC ............... H04B 1/03 (2013.01); G06Q 50/28 (2013.01); H04B 1/3888 (2013.01)
USPC .......................................... 343/872; 343/909

(58) Field of Classification Search
CPC ..................................................... H01Q 1/422
USPC .................................. 343/872, 909; 455/347
See application file for complete search history.

(56) References Cited

U.S. PATENT DOCUMENTS

| | | |
|---|---|---|
| 3,975,738 A | 8/1976 | Pelton et al. |
| 4,570,166 A | 2/1986 | Kuhn et al. |
| 6,522,226 B2 | 2/2003 | Crouch et al. |
| 7,456,793 B2 | 11/2008 | Napoles et al. |
| 2008/0258990 A1 | 10/2008 | Burrell et al. |
| 2010/0288843 A1 | 11/2010 | Arnesen et al. |

OTHER PUBLICATIONS

Chen, Chao-Chun, "Transmission Through a Conducting Screen Perforated Periodically with Apertures", IEEE Transactions on Microwave Theory and Technique. vol. MTT-18, No. 9, Sep. 1970, pp. 627-632.
Lee, J.W. et al., "Optimum areal coverage for perfect transmission in a periodic metal hole array", Applied Physics Letters, vol. 97, 261112 (2010).
Widenberg, B. et al., "Scattering from Thick Frequency Selective Screens", J. of Electromag. Waves and Applications, vol. 14, 2000, pp. 1303-1328.

*Primary Examiner* — Lee Nguyen
(74) *Attorney, Agent, or Firm* — HolzerIPLaw, PC

(57) ABSTRACT

An electromagnetic (RF) and light transparent enclosure having a perforated metallic wall. The enclosure is particularly adapted for an RF wireless tracking system, as a housing for the transmitter device or for a cargo container in or on which the transmitter device is positioned. The enclosure is optically transparent to ensure any photovoltaic device of the transmitter device receives sufficient photons or other energy to power the transmitter device. The RF transparent enclosure attenuates less transmitted and/or received signal at specific frequency bands.

18 Claims, 3 Drawing Sheets

LIGHT AND RF TRANSPARENT ENCLOSURE FOR USE WITH ASSET TRACKING DEVICE

CROSS-REFERENCE TO RELATED APPLICATION

This application claims the benefit of U.S. Provisional Application No. 61/671,230 filed Jul. 13, 2012, the entire contents of which are incorporated herein by reference for all purposes.

FIELD OF THE DISCLOSURE

This disclosure is directed to metallic containers (i.e., enclosures) for use with wireless RF tracking systems.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries. A wireless tracking device or system is highly beneficial for solving the dilemma of knowing the physical location of the asset at a set point in time.

Many wireless tracking devices utilize radio frequency (RF) to communicate between the tracking device (the transmitter) and the receiver. However, RF signals are unable to penetrate certain structural materials.

SUMMARY

This disclosure is directed to metallic containers (i.e., enclosures) for use with wireless RF tracking systems. The metallic enclosures are RF transparent and/or visible light transparent, allowing RF transmitters to be positioned within the enclosure without experiencing decreased performance. The enclosure may be a housing or case for the RF transmitter, or the enclosure may be a container, such as a shipping container, in or on which the RF transmitter is positioned. The enclosures, whether a housing or a container, are particularly suited for use for air freight cargo.

This disclosure provides, at least, a wireless RF transmitter device, for tracking assets such as air freight cargo. The transmitter device includes an RF communication module having an RF operating frequency, the operating frequency having an operating wavelength, and an enclosure enclosing the communication module. The enclosure has at least one wall that comprises a metallic plate having a pattern of apertures therethrough and a dielectric plate adjacent to the metallic plate. Each of the apertures has a length and a width, with the apertures arranged in columns and rows, with adjacent apertures in a row having a spacing therebetween, and a spacing between centers of adjacent apertures in adjacent rows. The apertures are shaped, sized and spaced to allow passage therethrough of the RF operating wavelength. Additionally, the apertures allow passage of visible light therethough. In some embodiments, the communication module is a ZigBee module or a ZigBee/LBT module. The apertures can be, for example, circular or rectangular.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

A wireless tracking system is highly beneficial in knowing the physical location of an asset at a set point in time. A "tracking system" and variations thereof includes at least one tracking or transmitter device, and a receiver for receiving the location signal from the tracking transmitter device(s). A "tracking device," "transmitter device," and variations thereof is a portable, signal emitting device configured for placement in or on an asset to be tracked, such as a container of goods.

Tracking is particularly beneficial for aircraft cargo, as it is not uncommon for cargo to be moved several times prior to be loaded on to the aircraft for its transport. Additionally, unlike over-the-road cargo, which can be quickly retrieved if placed on the wrong truck, an aircraft cargo container, if loaded on the wrong aircraft, will typically not be retrieved for an extended time period, because typically the aircraft will not be recalled or make an unscheduled landing merely because of one erroneously loaded container. When at the incorrect destination, the container will have to wait to find a return flight or an alternate flight to its desired destination. Because of the larger possibility of lost aircraft cargo containers, it is particularly desirable to know the immediate location of these containers.

Figure 1:
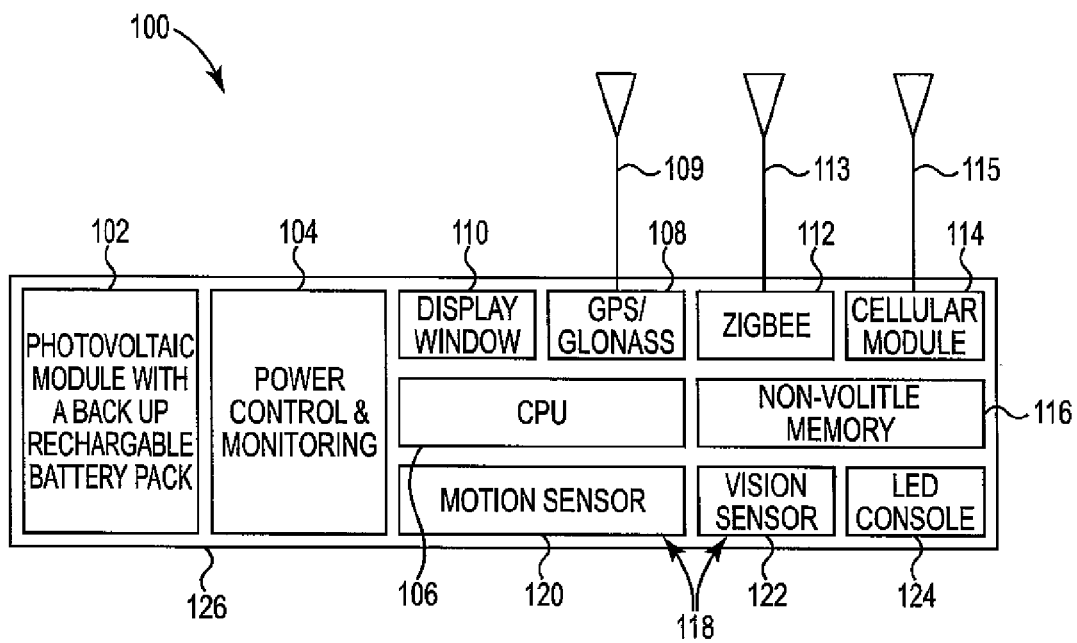
FIG. 1 is a schematic block diagram of a wireless tracking device.

FIG. 1 illustrates one embodiment of a tracking or transmitter device 100 that, together with a receiver (not shown), forms a tracking system. The particular device 100 is configured for use on an aircraft or in another location that must comply with FAA regulations; tracking device 100 has automatic on-off capabilities during transit in order to comply with FAA regulations, and utilizes both RF and cellular communication modes. The tracking system deactivates and reactivates transmitter device 100, and switches between RF and cellular communication networks, depending on the status of the aircraft, in compliance with FAA regulations and other regulatory requirements. For example, RF communications are not allowed, at least, during take-off and landing and at cruise altitude, and cellular communications are not allowed during taxiing, take-off, and at cruise altitude.

Device 100 includes a power source 102, which may be a single use battery or a rechargeable battery. Examples of suitable batteries include NiCad, lithium, lithium-ion, zinc-carbon, and alkaline batteries. For example, a 3.7V battery could be used, although it is understood that other voltage batteries could be used. In FIG. 1, power source 102 includes a rechargeable battery pack and a photovoltaic module to recharge the battery pack when needed. Other power source rechargers or regenerators could be utilized, such as an inductive coil, a USB power-line, and mechanical energy harvesting mechanisms.

Electrically connected to power source 102 is a power module 104 that includes a battery level monitor and a power control, which in turn is operably connected to a computer chip or CPU 106. Together CPU 106 and power module 104 activate and deactivate various elements of device 100, based on the status of the aircraft in which device 100 is located. Transmitter device 100 also includes a positioning element, in this embodiment a GPS/GLONASS positioning element 108 connected to an antenna 109, which may be an internal antenna or an external antenna, and may be embedded into a housing encasing the elements of device 100. Antenna 109 may be, for example, a planar inverted F antenna, an inverted L antenna, or a monopole antenna. Antenna 109 may be a multi-band antenna, one that can transmit and receive signals in multiple frequency bands. Positioning element 108 provides data to transmitter device 100 regarding its physical location.

Transmitter device 100 transmits information or data, such as its location, in the form of a "ping" to the remote receiver via a wireless network; the information or data may also be provided to a display 110 on device 100. In some embodiments, transmitter device 100 has two-way communication with the receiver. That is, transmitter device 100 transmits information (i.e., a ping) and also receives information from the receiver. Further, transmitter device 100 may receive instructions, such as to acknowledge that device 100 is active and ready and to transmit the location information. Having received those instructions, device 100 can send back to the receiver acknowledgement that the communication was received and acted on.

As indicated, the transmitter device is configured to send and optionally receive data via a wireless network. Device 100 of FIG. 1 is configured with a ZigBee module 112 to connect to the receiver via a ZigBee network and communicate data (e.g., position data). An alternate embodiment of a transmitter device can utilize a ZigBee/LBT module and a corresponding ZigBee/LBT network. Additionally, transmitter device 100 may include a data receiver (not shown), such as an infra red data link (IrDA), to provide a second communication means to device 100, as an alternate or back-up to module 112.

Device 100 also includes a cellular communication module 114, which may be CDMA (Code Divisional Multiple Access) and/or GSM (Global System for Mobile Communication) module, configured to connect to the receiver via either a CDMA or GSM network and communicate data to the receiver. Modules 112, 114, respectively, have an antenna 113, 115 which may optionally include a power amplifier to extend the range of the signal from modules 112, 114. In some embodiments, modules 112, 114 may be combined into a single physical module rather than two separate or distinct modules. Together, modules 112, 114 provide the communication basis for transmitter device 100 to the receiver. Module 112, which connects device 100 a wireless RF network, is utilized when FAA regulations allow use of RF communications, and module 114, which connects device 100 to a cellular network, is utilized when FAA regulations do not allow the use of RF communications yet do allow cellular communications.

Any of the data or information regarding device 100, such as its position as determined by positioning element 108, alarm information, battery level information, etc., can be stored in a memory 116 of device 100, which may be a permanent memory or a rewritable memory. Data from memory 116 may be transmitted to the receiver or may be retained in memory 116 until manually retrieved.

Transmitter device 100 includes a sensor array 118 to determine the location of device 100 in relation to an aircraft and to determine the status or mode of the aircraft, in order to determine when to activate and deactivate the device. Sensor array 118 includes at least one motion sensor 120 and a machine vision sensor 122. Motion sensor 120 can be, for example, a three degree of freedom (DOF) device that has a 3-axis accelerometer or can be a six degree of freedom (DOF) device that includes a 3-axis gyroscope and a 3-axis accelerometer. Other examples of suitable configurations for motion sensor 120 include a 9-DOF device that includes a 3-axis gyroscope, a 3-axis accelerometer and a 3-axis magnetometer, and a 10-DOF device that includes a 3-axis gyroscope, 3-axis accelerometer, 3-axis magnetometer, and an altitude sensor. Other embodiments of motion sensor 120 may be used. With the various multiple degrees of freedom, device 100 can distinguish among various movements, orientations and locations, such as lateral motion, acceleration, inclined or declined motion, and altitude. With this information, device 100 can determine the aircraft's status, e.g., idle, taxiing, take-off, cruising at altitude, landing, etc.

Device 100 may also include an indicator console 124 having various operational switches, gauges, buttons, and/or lights (e.g., LED lights). Console 124 may include any number of optional features, such as an audio alarm to indicate any number of problems or malfunctions, such as low battery level, unauthorized movement (as sensed by motion sensor 120), or tampering with device 100. Device 100 may include a temperature gauge.

The various elements that compose transmitter device 100 may be housed in an RF and/or cellular transmissive enclosure or housing 126, preferably one that is at least water resistant. At least a portion of housing 126 may be transmissive or transparent to RF and to visible light.

Device 100 can be placed into or on a cargo container and used to track the location of that container. Alternately, device 100 may be formed into the wall of a cargo container, thus being integral with the container. Of course, other tracking devices can be placed into cargo containers, including those described in U.S. patent application Ser. No. 13/796,574 filed Mar. 12, 2013 titled "Asset Tracking System with Adjusted Ping Rate and Ping Period," U.S. patent application Ser. No. 13/796,683 filed Mar. 12, 2013 titled "Asset Tracking System with Data Ping Based on Asset Movement," U.S. patent application Ser. No. 13/845,802 filed Mar. 18, 2013 titled "Asset Tracking System Activated by Predetermined Pattern of Asset Movement," and U.S. patent application Ser. No. 13/906,773 filed May 31, 2013 titled "Wireless Device with Hybrid Energy Charging."

Transmitter device 100 or other transmitter device can be placed in or on the cargo container to be tracked. In optimum conditions, the transmission of RF signals, both to and from the device, is uninhibited. For devices having a photovoltaic module, in order the to collect as much energy as possible for the tracking device, the photovoltaic device should be exposed to visible light, either directly or through a housing or container that is light transparent. However, a solid metallic enclosure, either as a housing or a container, inhibits the transmission of RF signals therethrough, and also inhibits the transmission of cellular signals. Additionally, a solid metallic enclosure does not allow sunlight or visible light therethrough. Alternately, the tracking device can be placed in a non-metallic enclosure. Non-metallic enclosures have been used for airline or airfreight shipping applications to obtain RF transparency and visible light transparency (e.g., optical transparency). Non-metallic enclosures, however, generally do not have sufficient crush strength, particularly to withstand use as shipping containers. Still alternately, the transmitter device can be placed in a metallic enclosure that is transparent to electromagnetic (e.g., RF) energy and to light (e.g., visible light). Such an enclosure allows transmission of photons therethrough to power the transmitter device. Such an enclosure also attenuates less transmitted/received signal of the tracking device.

In this disclosure, an enclosure is described, constructed with a perforated metallic material with aperture centers spaced apart uniformly by less than half the wavelength of the RF energy to be passed therethrough, or, by a periodic pattern of slits in the metallic material. Such an enclosure allows passage of RF signal and visible light therethrough. The enclosure may be a housing or case (e.g., housing 126) for a transmitter device or a cargo container in or on which a transmitter device is situated.

Figure 2:
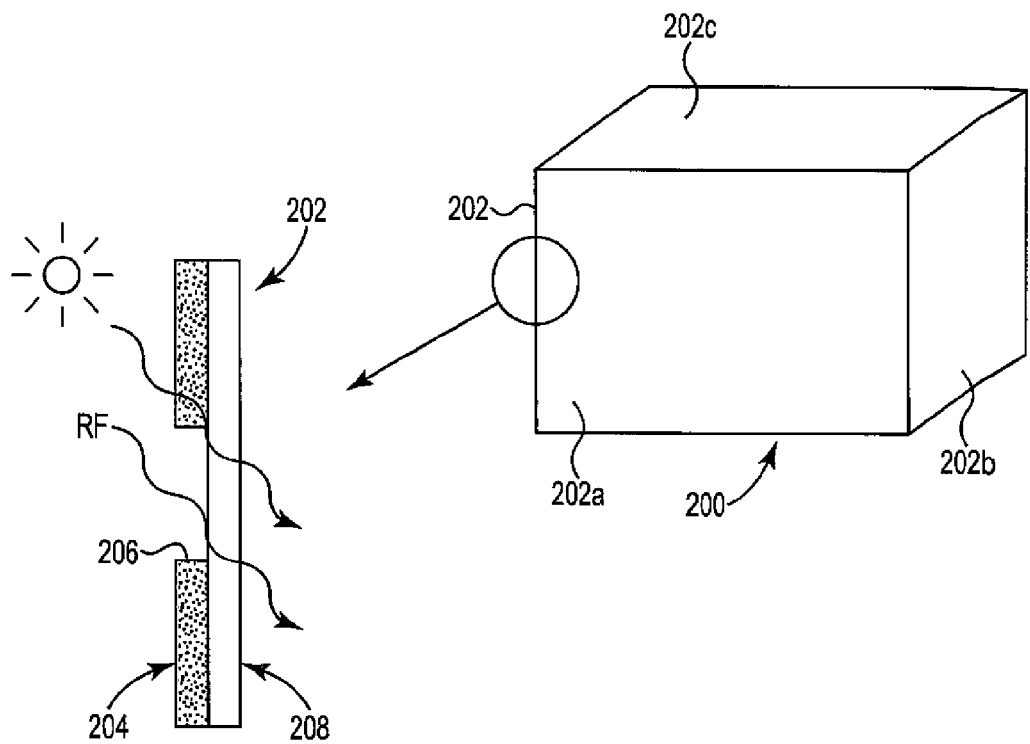
FIG. 2 is a schematic side view of an enclosure wall.

FIG. 2 illustrates an enclosure 200 formed from a perforated metallic material. Enclosure 200, in this embodiment, is a cuboid (rectangular) and includes a plurality of walls 202 (i.e., 202a, 202b, 202c, etc.) at least one of which includes the perforated metallic material.

Wall 202 is constructed from a metallic material 204 perforated with a periodic pattern of apertures 206 adjacent to a dielectric plate 208. Although not required, dielectric plate 208 is in contact with metallic material 204 and may be secured (e.g., adhered) thereto. The entire wall 202 may have the pattern of apertures 206 thereon, or only a portion of wall 202 may have apertures 206. Metallic material 204 can be any metal such as iron, steel (e.g., stainless steel), titanium, aluminum, copper, molybdenum, or brass. Metallic material 204 may be a metal alloy or an alloy of metal with a non-metallic material; for example, metallic material 204 may be a reinforced metal and/or composite materials. In some embodiments, a highly electrical conductive metal such as copper, beryllium copper, or aluminum is desired. The thickness of metallic material 204 is selected based on the dielectric constant of dielectric plate 208, the dimensions (e.g., diameter) of apertures 206, and the operating wavelength, since each of these parameters affect the equivalent electrical length of the waveguide formed by aperture 206 through metallic material 204.

Dielectric plate 208 provides structural support to wall 202 and also protects enclosure 200 and its contents against environmental elements (e.g., rain, humidity, dust, etc.). Dielectric plate 208 maybe a conventional dielectric material such as quartz, boron nitride, silicon nitride, beryllium oxide, aluminum oxide, or glass that is transmissive and preferably transparent to visible light. Preferably dielectric plate 208 is not opaque. In some embodiments, a second dielectric plate may be present on the other side of metallic material 204, thus forming a sandwich construction of metallic material 204 between two glass or dielectric plates 208. In most embodiments, the thickness of dielectric plate 208 is less than 10 times the thickness of metallic material 204.

Metallic plate 204 includes apertures 206 configured to allow the passage of RF and visible light therethrough. Apertures 206 may be referred to as waveguides, directing the passage of RF and visible light through metallic plate 204. RF energy, in general, has a frequency of 3 kHz to 300 GHz, which corresponds to a wavelength of 10 km to 1 cm. For most RF tracking systems, the RF frequency used is 0.4 to 7.2 GHz, which corresponds to a wavelength of 4 to 70 cm. Visible light includes wavelengths of about 390 to 700 nm, and near infrared (NIR) includes wavelengths of about 700 nm to 1 mm.

The frequency behavior of enclosure 200 can be designed by altering the shape, size and orientation of apertures 206 and also the thickness of metallic plate 204. Examples of suitable shapes for apertures 206 include circular, oval/elliptical, rectangular (including square), other polygonal, and irregular shapes. In most embodiments, all apertures 206 on container 200 or at least on wall 202 will have the same shape and size, although in some embodiments, the multiple shapes and/or sizes may be used to allow different wavelengths of energy to pass therethrough. Apertures 206 may be arranged in a regular, orderly pattern or may be randomly positioned. They may be arranged in parallel rows, with apertures in adjacent rows aligned to form columns orthogonal to the rows, or the rows may be offset.

Figure 3:
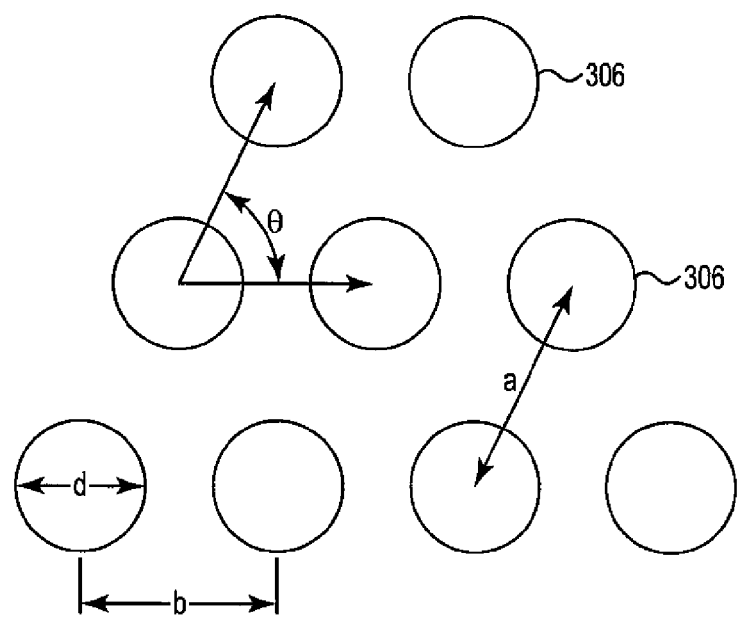
FIG. 3 is a depiction of a suitable aperture pattern for an enclosure wall with circular apertures.

In one embodiment, the aperture shape is circular, as shown in FIG. 3. A plurality of apertures 306 is shown, each having a diameter "d" equal to or less than half (½) the wavelength and more than quarter (¼) of the wavelength of the RF energy to be transmitted and/or received. This diameter "d" is both a length and a width or height for circular apertures 306. Apertures 306 in adjacent rows are spaced a distance "a" (between apertures centers) and apertures 306 in a row are spaced a distance "b" (between adjacent aperture centers), where both "a" and "b" are less than half (½) the wavelength of the RF energy to be passed. In this embodiments, apertures 306 form adjacent equilateral triangles, the centers of apertures 306 in adjacent rows/columns forming an angle "theta" (θ) of 60°, and thus "a" and "b" being equal. Particular examples of circular aperture patterns include: d=8 cm, a/b=16 cm, and theta=60 degrees, for RF energy having a wavelength of 33.31 cm; d=2.9 cm, a/b=5.85 cm, and theta=60 degrees, for RF energy having a wavelength of 11.71 cm; and d=1 cm, a/b=2 cm and theta=60 degrees, for RF energy having a wavelength of 4.16 cm.

Figure 4:
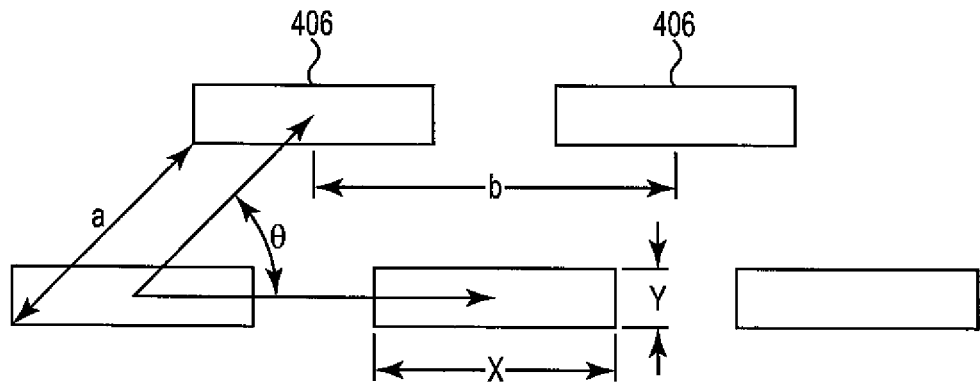
FIG. 4 is a depiction of a suitable aperture pattern for an enclosure wall with rectangular apertures.

In another embodiment, the aperture shape is rectangular, as shown in FIG. 4. A plurality of apertures 406 is shown, each having a length "x" that is at or close to half (½) the wavelength of the RF energy to be passed, and width or height "y" that is at or close to 1/N of the wavelength, where N is an integer between 10 and 100. Adjacent rows and columns form an angle "theta" (θ) that is between 5° and 45°. An interval distance "b" is between half (½) to full wavelength, and interval distance "a" is between half (½) the wavelength and full wavelength. Particular examples of rectangular aperture patterns include: x=5.85 cm, y=1.17 cm, a=10 cm, b=10 cm and theta=10 degrees, for RF energy having a wavelength of 11.71 cm; x=2.08 cm, y=0.416 cm, a=3 cm, b=3 cm and theta=15 degrees, for RF energy having a wavelength of 4.16 cm; x=16.65 cm, y=3.33 cm, a=20 cm, b=20 cm and theta=20 degrees, for RF energy having a wavelength of 33.31. Oval shapes, and other oblong shapes, fall within this rectangular embodiment.

Figure 5:
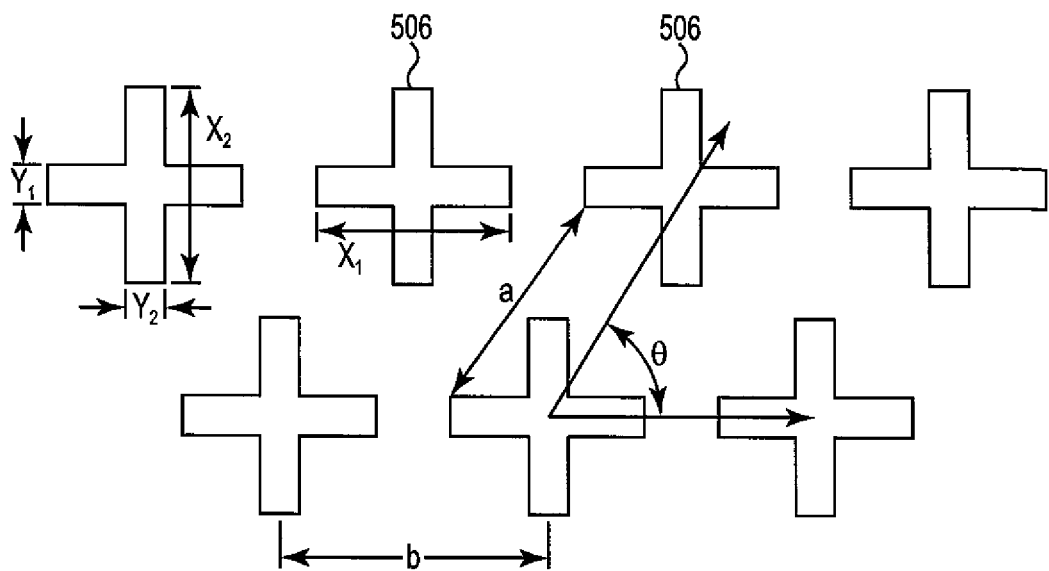
FIG. 5 is a depiction of a suitable aperture pattern for an enclosure wall with cross-shaped apertures.

FIG. 5 shows an embodiment with apertures 506 formed by multiple rectangular apertures arranged as crosses. In this embodiment, apertures 506 are formed by a first rectangle having length "$x_1$" and a width or height "$y_1$" and a second rectangle having length "$x_2$" and a width or height "$y_2$". Similar to single rectangles, "$x_1$" and "$x_2$" are at or close to half (½) the wavelength of the RF energy to be passed, and width or height "$y_1$" and "$y_2$" are at or close to 1/N of the wavelength, where N is an integer between 10 and 100. Adjacent rows and columns form an angle "theta" (θ). A distance "b" between the centers of adjacent apertures 506 is between half (½) to full wavelength, and distance "a" is between half (½) the wavelength and full wavelength.

The aperture patterns provided above are only a limited sample of the patterns that can be used to provide a RF energy and visible light transmissive metallic enclosure. As indicated, the metallic enclosure may be, for example, a housing for a transmitter device of a tracking system, or may be a cargo container having positioned therein or thereon a transmitter device of a tracking system.

Thus, various embodiments of the LIGHT AND RF TRANSPARENT ENCLOSURE FOR USE WITH ASSET TRACKING DEVICE are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A wireless RF transmitter device, the transmitter device comprising:
    an RE communication module having an RF operating frequency, the operating frequency having an operating wavelength; and
    an enclosure enclosing the communication module, the enclosure having at least one wall comprising a metallic plate having a pattern of apertures therethrough and a dielectric plate adjacent to the metallic plate, each of the apertures having a length and a width, with the apertures arranged in columns and rows, with adjacent apertures in a row having a spacing therebetween, and a spacing between centers of adjacent apertures in adjacent rows, wherein the apertures are shaped, sized and spaced to allow passage therethrough of the RF operating wavelength.

2. The wireless RF transmitter device of claim 1 wherein the apertures comprise circular apertures.

3. The wireless RF transmitter device of claim 2 wherein the circular apertures have a diameter that is no more than ½ of the operating wavelength and that is no less than ¼ of the operating wavelength.

4. The wireless RF transmitter device of claim 2 wherein the spacing between centers of adjacent apertures in a row and the spacing between centers of adjacent apertures in adjacent rows is less than ½ of the operating wavelength.

5. The wireless RF transmitter device of claim 2 wherein the centers of adjacent apertures in a row and the centers of adjacent apertures in adjacent rows form an equilateral triangle.

6. The wireless RF transmitter device of claim 1 wherein the apertures comprise rectangular apertures.

7. The wireless RF transmitter device of claim 6 wherein the apertures comprise crossed rectangular apertures.

8. The wireless RF transmitter device of claim 6 wherein the spacing between centers of adjacent apertures in a row and the spacing between centers of adjacent apertures in adjacent rows are independently no more than one full operating wavelength and is no less than ½ of the operating wavelength.

9. The wireless RF transmitter device of claim 8 wherein the spacing between centers of adjacent apertures in a row is the same as the spacing between centers of adjacent apertures in adjacent rows.

10. The wireless RF transmitter device of claim 6 wherein the centers of adjacent apertures in a row and the centers of adjacent apertures in adjacent rows form and angle that is between 5° and 45°.

11. The wireless RF transmitter device of claim 1 wherein the RF communication module comprises a ZigBee module.

12. The wireless RE transmitter device of claim 1 wherein the RF communication module comprises a ZigBee/LBT module.

13. The wireless RF transmitter device of claim 1 further comprising a positioning element.

14. The wireless RF transmitter device of claim 1 further comprising a sensor array comprising a motion sensor and a machine vision sensor.

15. A wireless RE transmitter device, the transmitter device comprising:
    an RF communication module having an RF operating frequency, the operating frequency having an operating wavelength;
    a positioning element;
    a sensor array; and
    an enclosure enclosing at least the communication module, the enclosure having at least one wall comprising a metallic plate having a pattern of apertures therethrough and a dielectric plate adjacent to the metallic plate, each of the apertures having a length and a width, with the apertures arranged in columns and rows, with adjacent apertures in a row having a spacing therebetween, and a spacing between centers of adjacent apertures in adjacent rows, wherein the apertures are shaped, sized and spaced to allow passage therethrough of the RF operating wavelength.

16. The wireless RF transmitter device of claim 15 wherein the RF communication module comprises a ZigBee module.

17. The wireless RF transmitter device of claim 15 wherein the RF communication module comprises a ZigBee/LBT module.

18. The wireless RF transmitter device of claim 15 wherein the sensor array comprises a motion sensor and a machine vision sensor.

* * * * *

UNITED STATES PATENT AND TRADEMARK OFFICE
CERTIFICATE OF CORRECTION

PATENT NO. : 8,872,723 B2  
APPLICATION NO. : 13/940842  
DATED : October 28, 2014  
INVENTOR(S) : Lee et al.

Page 1 of 1

It is certified that error appears in the above-identified patent and that said Letters Patent is hereby corrected as shown below:

Claims

Col. 7, Clm 1, line 46, delete "RE", and insert --RF--.
Col. 8, Clm 12, line 29, delete "RE", and insert --RF--.
Col. 8, Clm 15, line 38, delete "RE", and insert --RF--.

Signed and Sealed this
Twenty-first Day of April, 2015

Michelle K. Lee
*Director of the United States Patent and Trademark Office*